United States Patent [19]  [11]  4,426,090
Bender  [45]  Jan. 17, 1984

[54] PRESSURE RELIEF EXCLUSION SEAL

[75] Inventor: Michael J. Bender, Aurora, Ill.

[73] Assignee: Halogen Insulator & Seal Corp., Elk Grove, Ill.

[21] Appl. No.: 422,577

[22] Filed: Sep. 24, 1982

[51] Int. Cl.³ .......................... F16J 15/16; F16J 15/48
[52] U.S. Cl. ........................................ 277/27; 277/29; 277/50; 277/77; 308/187.1
[58] Field of Search ............... 277/27, 28, 29, 35, 277/47-50, 59, 70-72, 77, 79, 85, 152, 153, 166; 308/187, 187.1, 187.2

[56] References Cited

U.S. PATENT DOCUMENTS

| 1,958,907 | 5/1934 | Brouwer | 277/48 |
| 2,608,425 | 8/1952 | Krug | 277/89 X |
| 3,572,379 | 3/1971 | Popa et al. | 277/29 X |
| 3,938,813 | 2/1976 | Forch | 277/152 |
| 4,277,072 | 7/1981 | Forch | 277/153 X |

FOREIGN PATENT DOCUMENTS

| 2825622 | 1/1980 | Fed. Rep. of Germany | 277/153 |
| 351226 | 6/1931 | United Kingdom | 277/77 |
| 507842 | 6/1939 | United Kingdom | 277/25 |
| 550641 | 1/1943 | United Kingdom | 277/29 |

Primary Examiner—Robert S. Ward
Attorney, Agent, or Firm—Fitch, Even, Tabin & Flannery

[57] ABSTRACT

An exclusion seal for being removably mounted in a bearing mount is formed with an annular housing with an internal sealing means having a sealing ring is constructed to prevent a "blow-out" of the seal due to the high lubricant pressure. The annular housing has an annular ring wall and a radially extending wall defining an annular chamber in which is received the annular sealing ring which has an annular sealing surface for sealing engagement with an annular surface on a rotating shaft or on a bearing mount. The annular housing is often compressible to have a press fit connection to the bearing mount. One side of the seal is exposed to the grease and if the grease pressure exceeds a predetermined value the sealing ring shifts axially against a biasing force to uncover an outlet orifice formed in the ring wall of the housing to permit lubricant to escape. When the lubricant pressure drops below the predetermined value, the biasing force returns the sealing ring to again cover the outlet orifice. The predetermined value of lubricant pressure necessary to permit lubricant escape is less than the pressure which would cause failure of the sliding and fixed circumferential seals so that "blow-out" of the exclusion seal is prevented.

18 Claims, 8 Drawing Figures

PRESSURE RELIEF EXCLUSION SEAL

BACKGROUND OF THE INVENTION

The present invention relates generally to removeable bearing exclusion seals having a housing within which is an annular sealing ring and more specifically to an annular exclusion seal having a self-sealing pressure relief means which presents "blow-out" of the exclusion seal during bearing lubrication.

DESCRIPTION OF THE PRIOR ART

Various types of bearing assemblies have long been used for transmitting loads between a rotatable cylindrical shaft and another machine element. The term "bearing assembly" is used herein to describe such an assembly collectively and includes a bearing mount, bearing member and an associated cylindrical shaft. The bearing member is generally integral with or affixed to another machine element which thus serves as a bearing mount. The bearing has a receiving channel which is necessarily slightly large in diameter than the shaft so as to be adapted for receiving the same. This leaves an annular space between the bearing surface in the receiving channel and the cylindrical shaft which is referred to herein as the bearing-shaft interface.

In a bearing assembly, the surface of the bearing member makes either sliding contact with the shaft, as in the case of sleeve or thrust bearings, or rolling contact as in the case of roller bearings. In any event a lubricant film is generally maintained at the bearing-shaft interface to reduce frictional drag and heat generation. In order to retain this lubricant film and to prevent foreign particles from entering the bearing-shaft interface, various types of exclusion seals have been developed. The replaceable or removeable exclusion seals have a housing and carry within the housing an annular sealing ring are generally operative exterior of the receiving channel and adapted to be disposed about the cylindrical shaft and positioned adjacent the point where the shaft protrudes from the channel. The exclusion seals generally employ two circumferential sealing surfaces, one sealing surface being operative with the shaft and the other with the bearing mount. Because the shaft and bearing mount are in relative rotational motion, one sealing surface is in sliding contact with either the shaft or bearing mount while the other is a stationary seal.

A particularly difficult problem arises with exclusion seals when it becomes necessary to replenish or replace the lubricant at the bearing-shaft interface. The lubricants are usually flowable, petroleum based products, and are forced into the bearing-shaft interface under high pressure through small diameter channels which lead from the interface to a conveniently accessible location on the exterior of the machinery. During lubrication the exclusion seal prevents the escape of spent or excess lubricant from the receiving channel unless the pressure becomes sufficiently great to dislodge or rupture the seal (often termed a "blow-out").

Various pressure relief devices have been developed in an attempt to prevent the blow-out of these replaceable exclusion seals during bearing lubrication. Typically, pressure relief channels have been incorporated directly into bearing assemblies. Often, the relief channels are equipped with a spring-actuated pressure sensitive valve so that sufficiently high pressure can be maintained for proper lubricant distribution but blow-out of the exclusion seal prevented. Such relief channels, however, substantially increase the production cost of the bearing assemblies and tend to clog over a period of extended use. Also, because the relief channels are incorporated directly in the bearing assembly, they are frequently difficult to service due to limited accessibility.

Because the incorporation of a simple vent orifice in an exclusion seal defeats its design purpose, other means have been employed in attempts to provide an exclusion seal that is effective yet forgiving of high lubricant pressure. One such device is sold by Greene, Tweed & Company, North Wales, Pa., 19454, under the name of Checkseal. The Checkseal generally comprises a ring-like base having a circumferential and backswept flange integrally joined to the exterior of the base so that the end of the flange protrudes slightly beyond the end of the base. The base of the Checkseal is press-fitted over the shaft and positioned so that the outer edge of the circumferential flange contacts the exterior surface of the bearing mount. It is claimed that the flange will deflect and permit the escape of lubricant before the pressure becomes sufficiently high to damage the seal. The design of the Checkseal, however, would appear to prevent its use in those situations where it is desired that the exclusion seal make sliding contact with the shaft as opposed to the bearing mount.

U.S. Pat. No. 4,210,405 describes a pivot joint having an elastomeric sealing member between a pivot pin and a surrounding structure. The sealing member tends to extrude from the pivot joint between the pivot pin and surrounding structure when lubricant is inserted into the joint under pressure. Relief openings are provided in an outer diameter portion of the structure to allow discharge of lubricant.

A general object of the present invention to provide an exclusion seal for a bearing assembly having a self-sealing pressure relief means therein.

Another object of the present invention is to provide a seal having a sealing means that provides a sliding contact seal and also seals a pressure relief orifice.

These and other objects and features of the invention will be apparent from the following detailed description when taken together with the accompanying drawings of which:

DETAILED DESCRIPTION OF THE INVENTION

Figure 1:
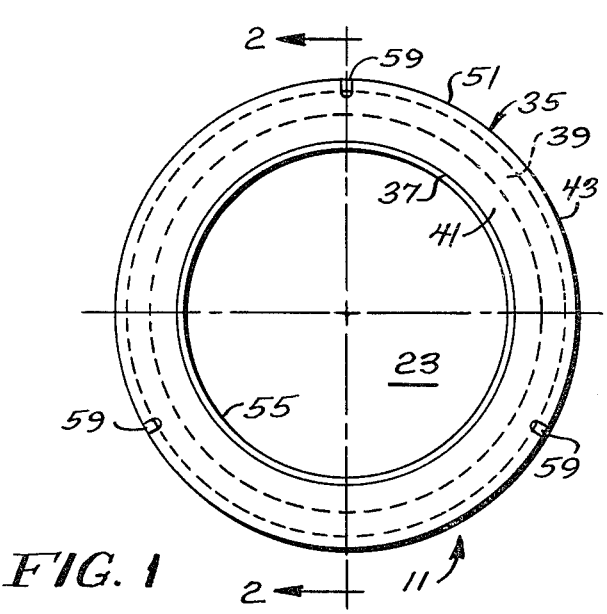
FIG. 1 is a front elevational view of an annular exclusion seal constructed in accordance with the present invention and adapted for being press-fitted into a countersunk bore in the bearing mount of a journal bearing assembly.
Figure 2:
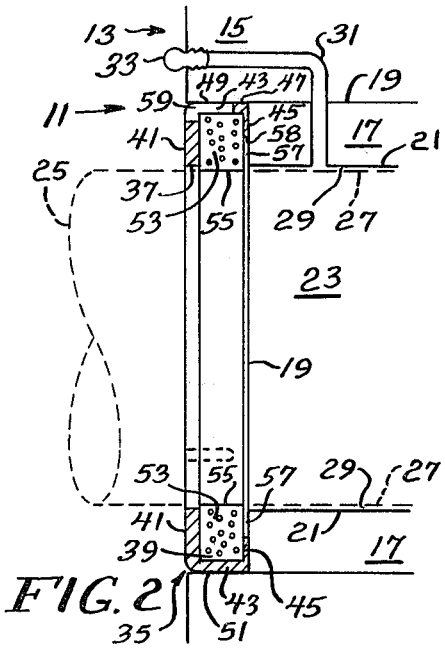
FIG. 2 is a cross sectional view of the annular exclusion seal shown in FIG. 1 taken along line 2—2, and looking in the direction of the arrows. The exclusion seal is shown press fitted in a countersunk bore in the bearing mount of a journal bearing assembly which is also shown in cross section and includes phantom lines depicting a cylindrical shaft associated with the bearing.

Referring now to the drawings and in particular FIGS. 1–3B, there is shown a first embodiment of the exclusion seal of the invention, indicated generally by reference numeral 11. As is best shown in FIG. 2, the exclusion seal 11 is adapted for use with a journal bearing assembly 13.

The bearing assembly 13 includes a bearing mount 15 that rigidly secures a sleeve bearing 17 in a cylindrical opening 19. The sleeve bearing 17 has a continuous internal cylindrical wall which presents a bearing surface 21 and defines a receiving channel or bore 23 which receives a cylindrical shaft 25. The bearing assembly is used to transmit loads between the bearing mount 15 and cylindrical shaft 25 while permitting relative rotational motion therebetween.

The diameter of receiving bore 23 is slightly larger than the diameter of shaft 25 to permit the shaft to rotate freely about its longitudinal axis within the confines of the receiving channel. This results in a small annular space between the bearing surface 21 and a cylindrical surface 27 of the shaft 25 which is referred to herein as the bearing-shaft interface 29. In order to reduce the frictional drag generated between the shaft and bearing surfaces 27 and 21, respectively, a lubricant film is generally maintained in the bearing-shaft interface 29. Typically, the lubricant is introduced under pressure through a small diameter lubricant channel 31 which generally includes a small one-way valve called a "grease fitting" which is schematically represented at 33. While the figures show an independent sleeve bearing 17, it will be appreciated that the bearing surface 21 could readily be formed as an integral part of bearing mount 15.

The exclusion seal 11 of the invention prevents the loss of lubricant from the bearing-shaft interface 29 in addition to preventing the entry of foreign particles therein. This result is accomplished by bridging the bearing-shaft interface 29 through the use of a fixed and sliding circumferential seal 11 having a sealing ring 53.

The seal 11 includes an annular housing 35 for the sealing ring 53 and the housing 35 has a center bore or opening 37 of a diameter slightly larger than the shaft 25 so as to prevent interference therewith. The housing 35 defines an annular chamber 39 formed about the center opening 37. The preferred housing has radially extending side walls 41 and 45 and the transverse cross section of the housing 35 (FIGS. 2–3B) shows that the housing side walls 41 and 45 are generally normal to the longitudinal axis of the shaft 25 and are joined to an encircling housing wall 43 which is generally concentric with the axis if the shaft 25. Forwardly disposed housing side wall 41 is greater in radial dimension than the rearwardly disposed wall 45 so that the latter may flex or more easily bend when the seal is press fitted into an annular seal receiving groove 47 which has been formed in the bearing mount 15. Groove 47 has an annular wall 49 which is sized to abut and have a press fitted engagement will exterior surface 51 of housing wall 43 and produces a circumferential seal therebetween. Because the housing wall 43 and bearing mount wall 49, remain in fixed relation during rotation of shaft 25, their engaged surfaces define a fixed or stationary seal.

Because the outside circumferential housing wall 43 is slotted by four slots 59, this reduces the stiffness of the wall 43 for having and maintaining a press fit within the groove 47. But the rearwardly disposed wall 45 aids in stiffening the circumferential housing wall to assure a good press fit of the housing wall 43 with the annular wall 49 of the groove 47.

As is best shown in FIGS. 1 and 2, housing or valve chamber 39 receives a sealing ring or valve member which is preferably in the form of a sealing ring 53. In the first illustrated embodiment, valve member 53 has a generally rectangular transverse cross sectional shape. The inner diameter the sealing ring 53 is such that its internal cylindrical surface 55 makes intimate contact with the facing cylindrical surface of the shaft 25. This contact forms the second circumferential seal which bridges the bearing-shaft interface. Because the shaft 25 rotates with respect to the seal ring surface 55, sliding contact occurs therebetween and this called the sliding sealing surface. The inwardly disposed housing wall 45 has a circular wall 58 facing the shaft 25 and spaced therefrom to provide an annular inlet space 57 which permits the lubricant to flow from the bearing-shaft interface 29 into housing chamber 39.

In accordance with the invention, the seal 11 is formed with a resilient sealing means including a sealing ring 53 which is movable within the housing 35 from a blocking or sealing position with a relief slot or orifice 59 in the ring wall 43 and a relief position in which the orifice is not sealed and through which grease may flow to relieve the pressure which could blow out the seal. The preferred outlet orifice 59 is formed in radially extending wall 41 and ring wall 43 and adapted for permitting lubricant to exit housing chamber 39 with axial compression of the sealing ring.

Figure 3A:
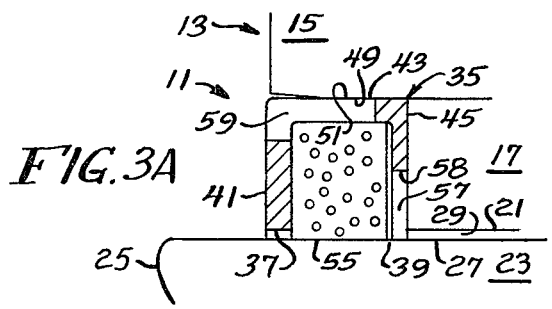
FIG. 3A is an enlarged, fragmentary view of FIG. 2 showing the valve member of the exclusion seal in the form of a compressible sealing ring in a relaxed position.
Figure 3B:
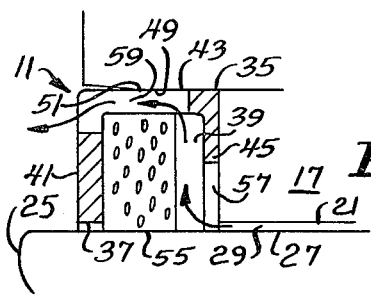
FIG. 3B is a view similar to FIG. 3A but showing the sealing ring valve member compressed to permit the flow of lubricant through the valve member.

As mentioned, the preferred sealing ring 53 is fabricated from a compressible elastomeric material. In its relaxed state, the sealing ring 53 loosely fits in the housing chamber 39, covering 59 (FIGS. 2 and 3A). When pressurized lubricant is forced through grease channel 31 and along into the bearing-shaft interface 29 some lubricant flows into cross inlet space 57 and into housing chamber 39. The compressible sealing ring is compressed by the force of the grease when the grease is under considerable pressure. If the grease pressure differential exceeds a predetermined value, the sealing ring 53 shifts and/or compresses axially sufficiently to its relief position and uncovers one or more outlet orifices 59 and permits lubricant to escape the housing chamber 39 (FIG. 3B) as shown by the arrows. The predetermined pressure differential required to permit lubricant escape is kept low enough so that the sliding and stationary circumferential seals formed by sealing surfaces 51 and 55 remain intact during lubrication and "blowout" of the exclusion seal 11 is prevented. When the pressure differential is reduced below a predetermined value, the compressible member, which is preferably an elastomeric material, returns to its original shape by expanding to its blocking position so that it again covers outlet orifices 59 and halts the flow of lubricant from the sealing ring, as it does in the position shown in FIG. 3A. In this manner, the pressure relief valve is said to be self-acting and self-sealing as the outlet orifice 59 is uncovered only when necessary to allow the escape of lubricant in response to pressure and returns to seal the orifice when the pressure is reduced. The exclusion seal 11 of the invention is particularly advantageous in that it permits spent lubricant to be periodically flushed from the bearing-shaft interface as a part of a generally maintenance routine without the usual necessity of first removing the seal.

The preferred cellular material is a mostly, closed cell polyurethane, microcellular foam having a density of about 40 pounds per cubic foot. The closed cells do not absorb contaminants, such as water and the closed cells act as "gas springs" giving the material good compression recovery. The polymer formulation and closed cells make this polyurethane foam highly resilient. This resiliency allows the sealing ring 53 to follow shaft run out and allows the axial compression when the bearing is greased.

Figure 5:
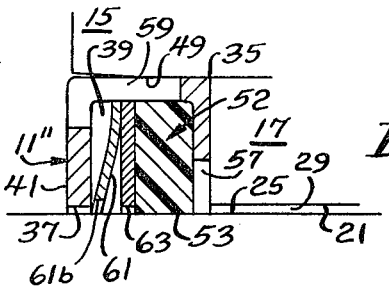
FIG. 5 is a view of a third embodiment of the invention, similar to FIGS. 3A and 4 but showing a sealing ring valve member having limited compressibility and actuated by a wave spring.

In these first embodiments of the invention, the resilient sealing means uses an elastomeric seal ring 53 to return the sealing ring to its blocking position but in a later embodiment of the invention, as illustrated in FIG. 5, a separate spring 61 serves to bias the sealing ring to its blocking position.

Figure 4:
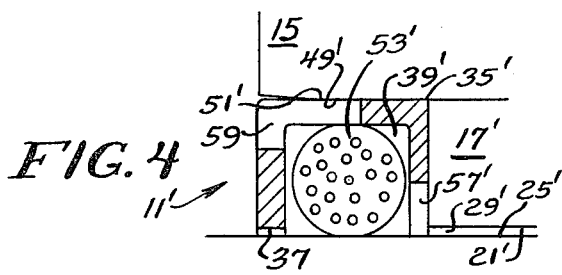
FIG. 4 is a view of a second embodiment of the invention, similar to FIG. 3A but showing the sealing ring valve member in the form of compressible "O" ring.

Referring now to FIG. 4, there is shown a second embodiment of exclusion seal of the invention indicated generally by reference numeral 11' (Identical parts are denoted herein with identical numbers and similar parts with primed numbers.). In the second embodiment, the exclusion seal 11' includes an identical annular housing 35 but has a sealing ring 53' in the form of an "O" ring fabricated from a compressible elastomeric material. "O" ring 53' functions like sealing ring 53 described above in that it forms a sliding circumferential seal with shaft 25 and is pressure responsive so as to permit lubricant to bleed through housing chamber 39 in order to prevent blow-out of the exclusion seal 11'. That is, the grease from the enter face 29' may travel across the entrance 57' into the housing chamber 39' and compress the sealing ring 53' to its relief position so that its upper right hand quadrant, as viewed in FIG. 4, no longer covers the orifices 59' in the outer annular wall 35'. Thus, grease flows out of the orifices until the pressure is reduced sufficiently to allow the "O" ring to expand and cover the orifices 59' in its sealing position.

A third embodiment of the invention 11" is disclosed in FIG. 5. This embodiment also includes an identical housing 35, the distinguishing feature of this embodiment being the resilient sealing means 52 includes a separate sealing ring 53" and a discrete spring 61 to bias the sealing ring to its position with the relief orifice 59. The sealing ring 53 is fabricated from a substantially incompressible material adapted to form a sliding seal with shaft 25. Because sealing ring 53" is substantially incompressible, independent means for causing the sealing ring 53" to cover and uncover outlet orifice 59 in response to lubricant pressure is provided in the form of a spring means 61 disposed in the housing chamber 39. The preferred spring 61 is an annular, thin metallic diameter spring which is curved or waved. Herein, the outer portion of the spring abuts the outer diameter edge of the sealing ring and the inner diameter portion 61b of the spring abuts the inner diameter section of the housing wall 41. Thus, excessive lubricant pressure from the bearing-shaft interface 29 causes the sealing ring 53" to shift to the left as viewed in FIG. 5 to its relief position against the resistance of spring 61 thereby compressing the spring and uncovering outlet orifices 59 and permitting lubricant to escape. As the lubricant pressure is reduced, the compressed spring 61 expands and causes the sealing ring to shift to the right to cover orifices 59. An annular washer 63 may be disposed between the spring 61 and sealing ring 53" to help evenly distribute the force of the spring 61.

Figure 6:
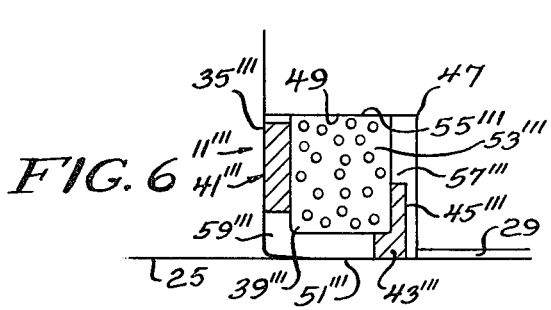
FIG. 6 is a view of a fourth embodiment of the invention, similar to FIGS. 3A, 4 and 5 but showing an exclusion seal adapted for being press-fitted onto the cylindrical shaft of a bearing assembly and forming a fixed seal therewith.

A fourth embodiment of the invention generally indicated by reference numeral 11''' is disclosed in FIG. 6. This embodiment includes a modified housing 35''' which is adapted to be press fitted onto the shaft 25 with sealing ring 53''' having sliding contact with the side wall 49 of the bearing mount 15. The housing 35''' has an annular housing wall 43''' which is sized to the shaft diameter to be pressed thereon and to have a fixed sealing surface 51''' therewith. Housing side walls 41''' and 45''' cooperate with annular housing wall to define the housing chamber 39''' in which is disposed the sealing ring 53'''. The sealing ring 53''' may be substantially identical to sealing ring 53 of FIG. 1 except that it is outer diameter that acts as a sliding sealing surface 55'''. The latter is adapted for sliding engagement with side wall 49 in countersunk bore 47 to form a sliding circumferential seal therewith as the shaft 25 housing and seal rotate. When the grease under high pressure flows across the interface 29 and through housing opening 57''' the grease compress the sealing ring in axial direction to expose the orifices 59''' which are located adjacent the shaft 25 to bleed off grease in the same manner described above in reference to the embodiments shown in FIGS. 1–5. With release of the pressure, the sealing ring will expand to cover the orifices.

Figure 7:
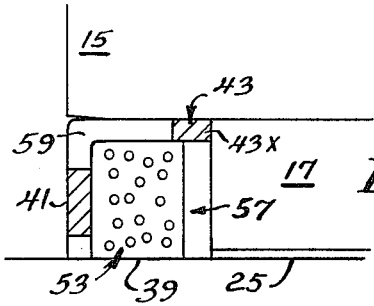
FIG. 7 is a view similar to FIG. 2 of a fifth embodiment of the invention.

A fifth embodiment of the invention is illustrated in FIG. 7 in which the radially extending rear side wall 45 of FIG. 1 has been eliminated and the outer annular wall 43 of FIG. 1 has been extended in the axial direction to provide a section 43X (FIG. 7) which extends axially of the sealing ring 53. The extension section 43X of the wall 43 provides an oversize chamber or cavity 39 for the sealing ring 53. The annular inlet space or chamber 57 may not be well defined at times in that the sealing ring 53 may have slid to right in FIG. 7 and have covered the chamber 57 in whole or in part; but when the seal is greased the initial pressure of the grease will slide the sealing ring 53 to the left to the position shown in FIG. 7 to re-establish the chamber 57. After this, the seal will function as above described in connection with FIG. 2.

It will be appreciated that while the exclusion seal of the invention has been described in connection with a sleeve bearing assembly, other embodiments, including those adaptable for use with roller bearing or thrust bearing assemblies will become apparent to those skilled in the art. Accordingly, the scope of the present invention should be defined only by the appended claims and equivalent thereof.

Various features of the invention are set forth in the following claims.

What is claimed is:

1. An annular exclusion seal for use with a bearing and a bearing mount, said exclusion seal comprising:
   an annular housing for being removeably mounted in the bearing mount and having a central opening for receiving a cylindrical shaft,
   an annular ring wall on said housing, at least one radially extending side wall joined to said ring wall and defining therewith an annular chamber, resilient sealing means including a sealing ring in said annular chamber having a sealing surface for sealing engagement with a sealing surface on another member with the sealing surfaces having a relative rotational sliding surface contact with each other to prevent grease from flowing past the sealing surface, means on said annular housing defining an outlet orifice extending into said ring wall to permit grease to flow from the housing, said resilient sealing means being movable from a sealing position blocking flow of grease through said orifice to a relief position allowing grease to flow past said sealing ring and through said orifice, said resilient sealing means returning said sealing ring to said sealing position when the grease pressure has been reduced below a predetermined pressure.

2. A seal in accordance with claim 1 wherein said sealing ring is fabricated from a material which is substantially incompressible under the pressures involved, said sealing means comprises a biasing means in said housing biasing said sealing ring to the sealing position.

3. A seal in accordance with claim 2 in which said biasing means comprises an annular spring disposed in said housing and forcing the sealing ring toward one of said radially extending side walls.

4. A seal in accordance with claim 1 wherein said sealing ring is fabricated from a closed cell, polyurethane foamed material which is compressed by the grease to move to its relief position and which expands when the pressure is relieved.

5. A seal in accordance with claim 4 wherein said sealing ring is in the form of an "O" ring.

6. A seal in accordance with claim 1 wherein said annular ring wall is disposed radially outwardly of said sealing ring and the sealing surface on the sealing ring engages a rotation shaft.

7. A seal in accordance with claim 1 wherein said annular ring wall is disposed radially inwardly of the sealing ring to be abutted against a shaft and the sealing surface on the sealing ring extends radially outwardly from the housing.

8. A seal in accordance with claim 1 wherein the means defining an orifice comprises slots formed in the ring wall and slots formed in the radially extending side walls, the sealing ring uncovering the slots to allow grease to flow through the slots.

9. A seal in accordance with claim 1 wherein a front radially extending side wall extends to adjacent the rotating shaft and a rear radially extending side wall is spaced by a greater distance from the shaft.

10. A seal in accordance with claim 1 wherein a rear side wall is formed on said annular housing having a radial extend less than the radial extent of the sealing ring to allow the grease to push against an exposed portion of the sealing ring.

11. An exclusion seal having a self-sealing pressure relief valve, said exclusion seal being adapted for sealing an annular space between a cylindrical shaft and a bearing member in a bearing assembly of the type wherein said bearing member is secured in a bearing mount, said exclusion seal comprising, in combination:

an annular housing having a center bore adapted for receiving said cylindrical shaft so that said housing can be positioned adjacent said annular space;

said housing having an annular groove formed therein defining a valve chamber;

a valve member in the form of a sealing ring disposed in said valve chamber;

said housing and said sealing ring having, respectively, fixed and sliding circumferential sealing surfaces formed thereon adapted forming a fixed and a sliding seal with said bearing assembly so as to bridge said annular space;

said housing having a front and rear portion, the rear portion of said housing adapted for being disposed adjacent said annular space and having an opening formed therein adapted for permitting lubricant to flow from said annular space into said valve chamber;

said front portion of said housing having an outlet orifice formed therein adapted for permitting lubricant to flow out of said valve chamber; and pressure responsive means for causing said valve member to cover said outlet orifice and substantially prevent the flow of lubricant therethrough when the lubricant pressure in said valve chamber is below a predetermined value and to uncover said outlet orifice and permit the flow of lubricant therethrough when said lubricant pressure exceeds said predetermined value.

12. Apparatus in accordance with claim 11 wherein said sealing ring is fabricated from a material which is substantially incompressible and when subjected to a pressure of said predetermined value and said pressure responsive means is provided in the form of at least one compression spring forwardly disposed in said valve chamber and adopted bearing against said sealing ring.

13. Apparatus in accordance with claim 11 wherein said sealing ring is fabricated from a compressible elastomeric material which inherently includes said pressure responsive means.

14. Apparatus in accordance with claim 13 wherein said sealing ring is in the form of an "O" ring.

15. Apparatus in accordance with claim 11 wherein said fixed sealing surface is adapted for engagement with said bearing mount and said sliding surface is adapted for engagement with said cylindrical shaft.

16. Apparatus in accordance with claim 11 wherein said fixed sealing surface is adapted for engagement with said cylindrical shaft and said sliding sealing, surface is adapted for engagement with said bearing mount.

17. Apparatus in accordance with claim 11 wherein said housing has two generally parallel valve walls interconnected by a third valve wall generally normal to said parallel walls; and said third wall having said fixed circumferential sealing surface forward thereon.

18. Apparatus in accordance with claim 11 in which said housing has an annular forward side wall extending radially, and a circumferentially extending wall joined to said side wall to define said valve chamber, said annular wall extending beyond the sealing ring in a direction toward the bearing to define said opening at the rear of said housing.

* * * * *